(12) United States Patent
Montezano (10) Patent No.: US 12,356,907 B2
(45) Date of Patent: Jul. 15, 2025

(54) INVERTED PLANT GROWTH AND SELECTION SYSTEM AND METHOD OF USE

(71) Applicant: Blas Montezano, Miami, FL (US)

(72) Inventor: Blas Montezano, Miami, FL (US)

( * ) Notice: Subject to any disclaimer, the term of this patent is extended or adjusted under 35 U.S.C. 154(b) by 0 days.

(21) Appl. No.: 17/683,366

(22) Filed: Mar. 1, 2022

(65) Prior Publication Data
US 2024/0298587 A1   Sep. 12, 2024

(51) Int. Cl.
*A01G 31/02*   (2006.01)
*A01G 31/04*   (2006.01)

(52) U.S. Cl.
CPC .................. *A01G 31/045* (2013.01)

(58) Field of Classification Search
CPC .......... A01G 9/12; A01G 17/04; A01G 17/10; A01G 31/06; A01G 9/022; A01G 9/024; A01G 9/023; A01G 22/05; A01G 17/00; A01G 31/04; A01G 9/1476; A01G 31/00; A47G 7/044; A47G 7/045; A47G 7/047; A47G 7/042

USPC .......................................................... 47/59 R
See application file for complete search history.

(56) References Cited

U.S. PATENT DOCUMENTS

| | | | | |
|---|---|---|---|---|
| 3,930,334 | A * | 1/1976 | Johnston | A47G 7/047 40/406 |
| 10,440,900 | B1 * | 10/2019 | Higgins | H05B 47/19 |
| 2014/0318007 | A1 * | 10/2014 | Hogan | A47G 7/044 119/51.01 |
| 2018/0242536 | A1 * | 8/2018 | Park | A01G 9/024 |
| 2018/0317408 | A1 * | 11/2018 | Castaldini | A01G 31/02 |
| 2018/0359930 | A1 * | 12/2018 | Millar | G10K 15/02 |
| 2022/0151165 | A1 * | 5/2022 | Edelstein | A01G 31/02 |

* cited by examiner

*Primary Examiner* — Morgan T Jordan
(74) *Attorney, Agent, or Firm* — Bryan E. Wilson (57) ABSTRACT

An inverted plant growth and selection system and method of use is provided for growing high quality vegetation yields with fewer resources and comprises a plurality of cisterns, growing propagation vessels, hoist modules, automated light control stations, and aquatic and ambient air frequency stimulations.

12 Claims, 10 Drawing Sheets

INVERTED PLANT GROWTH AND SELECTION SYSTEM AND METHOD OF USE

CROSS-REFERENCE TO RELATED APPLICATION

Not applicable.

TECHNICAL FIELD

The present invention relates generally to systems and methods for providing a hydroponics system that may be used to grow plants without the use of soil. More specifically, the present invention relates to an inverted plant growth and selection system and method of use.

BACKGROUND

Hydroponics is a form of horticulture that allows for plants to grow in water rather than in soil. The use of hydroponics is widespread and used for growing a variety of terrestrial plants as hydroponics offers high growth yields in a fraction of the space required for traditional farming. Traditional hydroponic systems allow for terrestrial plants to be grown with only their roots exposed to nutrient enriched water (aqueous solvent), whereby the roots are physically supported by some form or substrate medium such as rockwool, coconut fiber, perlite, or sand. Traditional hydroponic systems also utilize plastic net pots to contain the growing medium, the plant roots, and the plants themselves. The net pots are then placed into larger sealed enclosures where the net pots and the plant roots are exposed to the aqueous solvent.

Traditional hydroponic systems and methods are premised on drip hydroponics, flood-and-drain hydroponics, water culture hydroponics, and aeroponics. In each of these basic hydroponic systems, water is supplied to the growing medium or net pot while the terrestrial plant transports the aqueous solvent up from the root through the plant xylem (i.e. osmosis) until the aqueous solvent reaches the mesophyll cells which, in turn, releases the aqueous solvent through the plants stomata.

The stomata allow for carbon dioxide to enter a plant for photosynthesis, which provides energy to enable plant growth. Various environmental factors impact the functional effectiveness of the stomata, including temperature, carbon dioxide concentrate in the leaf, water quantity, air, and light. The amount of water that is attracted to the plant cells, however, is contingent upon the amount of osmotic pressure present within the plant cell membranes. Unfortunately, traditional hydroponic systems and methods do not impact osmotic pressure and therefore do not impact the rate of plant growth.

Traditional hydroponic systems and methods are also limited by the means available to harvest the fully-grown plants. These hydroponic systems focus primarily on horizontal production techniques, which are subject to major space restraints. Certain plants, such as garden plants, that obtain any marginal height or width may have their upward and outward growth restricted by the tops and sides of closed hydroponic systems or other closely spaced plants. While smaller plants may be quickly and efficiently removed from the hydroponics system with the roots intact, larger plants may be more difficult to harvest because of the weight of the plant, the folding of the plant leaves, and the size of the plant roots.

Various attempts have been made, although unsuccessfully, to solve the drawbacks of the traditional hydroponic and plant growth systems. One illustrative attempt can be seen with respect to U.S. Patent Application No. 2011/0126454 A1, U.S. Pat. No. 8,904,707 B2, U.S. Pat. No. 6,298,600 B1, and U.S. Patent Application No. 2010/0242359 A1, which generally disclose an inverted plant growth bag/bucket that allows a plant to grow from the roots down (i.e. inverted). While this disclosure indirectly addresses water circulation and osmotic pressure, it is not a hydroponic system. This disclosure also fails to disclose the impact of plant growth and plant harvesting.

Another example can be seen with respect to U.S. Pat. No. 10,888,054 B2 which generally discloses a vertical hydroponic tower system. While this disclosure does address the space restrictions typically found in traditional hydroponic systems, the disclosure does not address the impact of osmotic pressure.

As can be seen, various attempts have been made to solve the problems which may be found in the related art but have been unsuccessful. A need exists for a new and novel inverted plant growth and selection system and method.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

Furthermore, all elements listed by name, such as inverted, hydroponics, seed, spout, frequency, growth, and so forth are herein meant to include or encompass all equivalents for such elements. Such equivalents are contemplated for each element named in its particular herein.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention relates to an inverted hydroponics system that overcomes the deficiencies of the prior art. The general purpose of the present invention, which shall be described subsequently in greater detail, is to provide an inverted hydroponics system and method to allow for maximum plant growth and efficient harvesting for commercial scale applications.

The features of the invention which are believed to be novel are particularly pointed out and distinctly claimed in the concluding portion of the specification. By way of a non-limiting example, the present invention provides a novel solution for inverted hydroponics system and method to allow for paramount plant growth and effective harvesting for commercial scale systems. These and other features, aspects, and advantages of the present invention will become better understood with reference to the following drawings and detailed description.

By utilizing a plurality of sprouting systems, cisterns of varying sizes, growing propagation vessels, hoist modules, automated light control stations, aquatic nutrient solvent, and aquatic and ambient air frequency stimulations, the present invention comprises a plant growing and selection system and method that allows for maximum plant growth and efficient harvesting for commercial applications.

In accordance with an aspect of the present invention, an inverted plant growth and selection system and method of use is provided for growing high quality vegetation yields with fewer resources. In a preferred embodiment of the invention, the inverted plant growth and selection system and method comprises a plurality of cisterns whereby each cistern has at least three enclosed sides and is configured to hold a predetermined unit of aqueous solvent. In some embodiments, the selected size of the cistern is predicated on the stage of growth of the plant, the weight of the plant, and the species of the plant.

In some embodiments, each cistern has at least one protruding wall that is permanently affixed to a mantel. In accordance with an aspect of the invention, the mantel comprises a flat top and bottom surface, and a proximal end that extends beneath the surface of the predetermined unit of aqueous solvent contained within the cistern and a distal end that extends over the ledge of the protruding wall. In accordance with further aspects of the invention, the mantel is configured to allow a plant root system to lay over the top flat surface of the mantel whereby the plant roots are submerged beneath the surface of the predetermined unit of aqueous solvent contained within the cistern and the root stem extends vertically and downwardly from the distal end of the top flat surface of the mantel.

In some embodiments, each cistern has at least one protruding wall that is permanently affixed to a grooved root containment support beam. In accordance with an aspect of the invention, the grooved root containment support beam is permanently affixed to the inner wall of the cistern and comprises a hollow interior having a proximal end and a distal end. In some embodiments, the proximal end of the grooved root containment support beam extends parallel along the inner surface of the protruding wall of the cistern and is submerged in the predetermined unit of aqueous solvent held by the cistern. In a preferred embodiment of the invention, the grooved root containment support beam is further configured to provide anchorage for the root system of a plant whereby the roots extend beyond the proximal end of the grooved root containment support beam and are submerged in the predetermined unit of aqueous solvent held by the cistern. The plant root system extends throughout the chamber of the grooved root containment support beam's hollow cylinder whereby the plant stem extends from the distal end of the grooved root containment support beam. In such embodiments, the plant stem extends vertically and downwardly from the grooved root containment support beam, thereby allowing the plant to grow while inverted.

Yet, in other embodiments, the cistern is structured to have four enclosed walls, a bottom surface, and an open top surface thereby forming a chamber to hold a predetermined unit of aqueous solvent. In accordance with an aspect of the disclosed embodiment, the cistern may be configured to have at least one growing propagation vessel that extends from the bottom surface of the cistern. In such configurations, the growing propagation vessel is a hollow cylindrical chamber having a proximal end and a distal end whereby the root system of a plant extends through the hollow chamber through the proximal end of the hollow cylindrical chamber of the growing propagation vessel and the plant stem extends from the distal end. In accordance with a further aspect of the disclosed embodiment, the plant root system extends over the edge of proximal end and are submerged beneath the surface of the predetermined unit of aqueous solvent contained within the cistern, and the plant stem extends vertically and downwardly from the distal end of the hollow cylindrical chamber of the growing propagation vessel, allowing the plant system to grow outwardly from the bottom surface of the cistern.

Other embodiments of the present invention allow for a root nourishment membrane configured to provide moisture and support for the plant root systems, to lay over and/or enclose the plant root systems that are submerged within the cisterns.

In accordance with certain aspects of the invention, the cisterns may be contained within a containerized module, building, or warehouse structure whereby the building or warehouse is configured to allow the cisterns to be placed near the top of the building or warehouse structure, thereby allowing the plant system to grow inverted from the cistern towards the floor of the building or warehouse structure.

In an embodiment of the present invention, automated lifting control modules are affixed to each cistern and are configured to provide customized lighting, air circulation, growth stimulation frequencies based on the plant type, plant growth cycle, and plant size. In accordance with an aspect of the disclosed embodiment, the automated lifting control module extends from the top of the cistern with cables running along the length of the plant, whereby the cable holds a circulating fan and a light growth stimulation module in place below the plant at the optimal growing distance from the canopy of the plant to encourage optimal growth and development of the plant. In a preferred embodiment of the present invention, the automated lifting control module has sensors that enable the module to automatically adjust the module's distance from the cistern based on the height and growth rate of the plant that is growing from the cistern that is affixed to the automated lifting control module.

In accordance with further aspects of the present invention, the building or warehouse structure is configured to allow for plants of the same type, growth stage, and/or size to be placed in the same areas of sections of the building or warehouse structure. By way of non-limiting example, the growth phase begins at a "Sprouting Garden" growing area, plants having a growth size of nine to twelve inches are placed in a "Kender-Garden" growing area, plants having a growth size of thirty-six to sixty inches are placed in a "Middle Garden" growing area, plants that have a growth size of seventy-two to ninety-six inches are placed in a "High-Garden" growing area, and in its final phase to maturity the plants are placed in a "Main Grow" growing area. The placement of the plants in each of the aforementioned growing areas is determined by the weight, size, and species of the plant.

The Sprouting Garden growing area may comprise of a multi-tiered piping system whereby each pipe contains a hollow interior that is configured with a plurality of plant sprout boxes and misting valves. In some aspects, each pipe further comprises of a support beam to hold the plurality of plant sprout boxes in place. Each plant spout box at a top opening facing the hollow interior of the pipe, and a bottom opening that faces downwardly away from the base of the pipe.

During the plant germination and growth process, the configuration of the plant sprout box enables the plant roots to grow upwardly towards the hollow interior of the pipe whereby the plant body grows downwardly (inverted). The plant roots growing from the plant sprout box receive nutrients from the aqueous solvent disbursed from the misting valve. The Sprouting Garden growing area may further comprise of lighting systems arranged to provide sufficient light to effectuate optimal growth for the sprouting plants.

The Kender Garden growing area may comprise a plurality of cisterns arranged in a multi-tiered system to allow for the optimal growth environment for plant systems ranging between the size of nine to thirty inches. By way of non-limiting example, the cisterns may be stacked vertically at equal distances. Modular light bars, fans, and an aqueous solvent irrigation system may be incorporated into the multi-tiered system to further support the optimal grown environment for the plant systems.

The Middle Garden and High Garden growing areas may comprise a plurality of cisterns, hoist modules, modular lighting systems, and an aqueous solvent irrigation system. In accordance with yet further aspects of the present invention, the building or warehouse structure is further configured to allow for each plant system to be accessible by a multi-tiered scaffold apparatus and or scissor lift when the plants are readied to be transitioned to another growing area, harvested or—as pertaining to certain plant types and species—and processed accordingly.

In some embodiments, and to effectuate plant system movement for smaller plant systems, a transport cistern module may be used. In some aspects, the transport cistern module may be configured to hold plant systems, while protecting the plant root stem. The base of the transport cistern module may be configured to allow for a forklift system to safely lift the transport cistern module from one are to another.

In some embodiments, and to effectuate plant system movement, harvesting, or drying for larger plant systems, a lifting hoist link is removably affixed to each root system support membrane that resides in each cistern. In accordance with the disclosed embodiment, the lifting hoist link comprises a flat disk-shaped surface having a hoist stem extending perpendicularly from the center of said flat disk-shaped surface. The hoist stem is further configured to removably connect to a hoist system while simultaneously lifting the entire plant root system, perpendicularly, out of the predetermined unit of aqueous solvent in the cistern chamber.

The embodiments of the invention described herein are exemplary and numerous modifications, variations and rearrangements can be readily envisioned to achieve substantially equivalent results, all of which are intended to be embraced within the spirit and scope of the invention. Furthermore, while the preferred embodiment of the invention has been described in terms of the components and configurations, it is understood that the invention is not intended to be limited to those specific dimensions or configurations but is to be accorded the full breadth and scope of the spirit of the invention.

BRIEF DESCRIPTION OF THE DRAWINGS

These and other features, aspects and advantages of the present invention will become better understood with regard to the following description, appended claims, and accompanying figures where:

DETAILED DESCRIPTION

Abbreviations and Definitions

Aqueous Solvent: as used herein, the term "aqueous solvent" refers to a water based solution comprising of minerals aimed to assist with plant growth.

Cistern: as used herein and traditionally in the industry of the art, the term "cistern" refers to a tank or trough for storing a predetermined unit of aqueous solvent.

Growing Propagation Vessel: as used herein, the term "growing propagation vessel" refers to a cylindrical apparatus having a hollow support tube extending throughout the center of the cylindrical apparatus and configured to allow plant root systems to extend through the center of the hollow support tube and over the top of the tube thereby allowing the roots to develop while submerged in water. The tube simultaneously supports the weight of the plant in an inverted state.

Root Nourishment Membrane: as used herein, the term "root nourishment membrane" refers to a nutrient impregnated membrane configured to lay over plant root systems that are partially submerged in the predetermined unit of aqueous solvent of a cistern.

Hoist Module: as used herein, the term "hoist module" refers to an automated system allowing for a hoist beam to raise and lower the fanning light growth stimulation module. An electrical cable may also be affixed thereto.

Growing Area: as used herein, the term "growing area" refers to the area of the building or warehouse structure that is designated for plant growth and maturity.

Sprouting Garden: as used herein, the term "Sprouting Garden" refers to the growing area designated for plants in the earlier stages of development, particular plants that are less than twelve inches in length. The length may vary depending on the specific plant species.

Kender Garden: as used herein, the term "Kender Garden" refers to the growing area designated for plants ranging from twelve to twenty-four inches in length. The length may vary depending on the specific plant species.

Middle Garden: as used herein, the term "Middle Garden" refers to the growing area designated for plants ranging from to twenty-four to sixty inches in length. The length may vary depending on the specific plant species.

High Garden: as used herein, the term "High Garden" refers to the growing area designated for plants ranging from sixty inches to ninety-six inches in length.

Main Grow Area: as used herein, the term "Main Grow Area" refers to the growing area designated for plants to reach full maturity. In the main grow area, plants may be more than ninety-six inches in length.

Growth Stimulation Frequency: as used herein, the term "growth stimulation frequency" refers to unique and proprietary sound wave frequencies attuned to a plant's type, size, and growth stage, to achieve optimal growth rate and maturity.

Fanning Light Growth Stimulation Module: as used herein, the term "fanning light growth stimulation module" refers to an apparatus that is removably affixed to the hoist module, allowing the plant system to receive air, light, and growth stimulation frequency based on the plant's type, size, and growth stage, to achieve and optimal growth rate and maturity.

As used herein, words and terms referring to vegetation, plants, growth, plant maturity, harvesting, and frequency shall have their ordinary meaning, as known in the field of the art.

The present invention overcomes the limitations of the prior art by providing a new and more effective inverted hydroponics system and method to allow for maximum plant growth and efficient harvesting for commercial scale applications.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may not be shown in detail in order not to obscure the embodiments.

Figure 1:
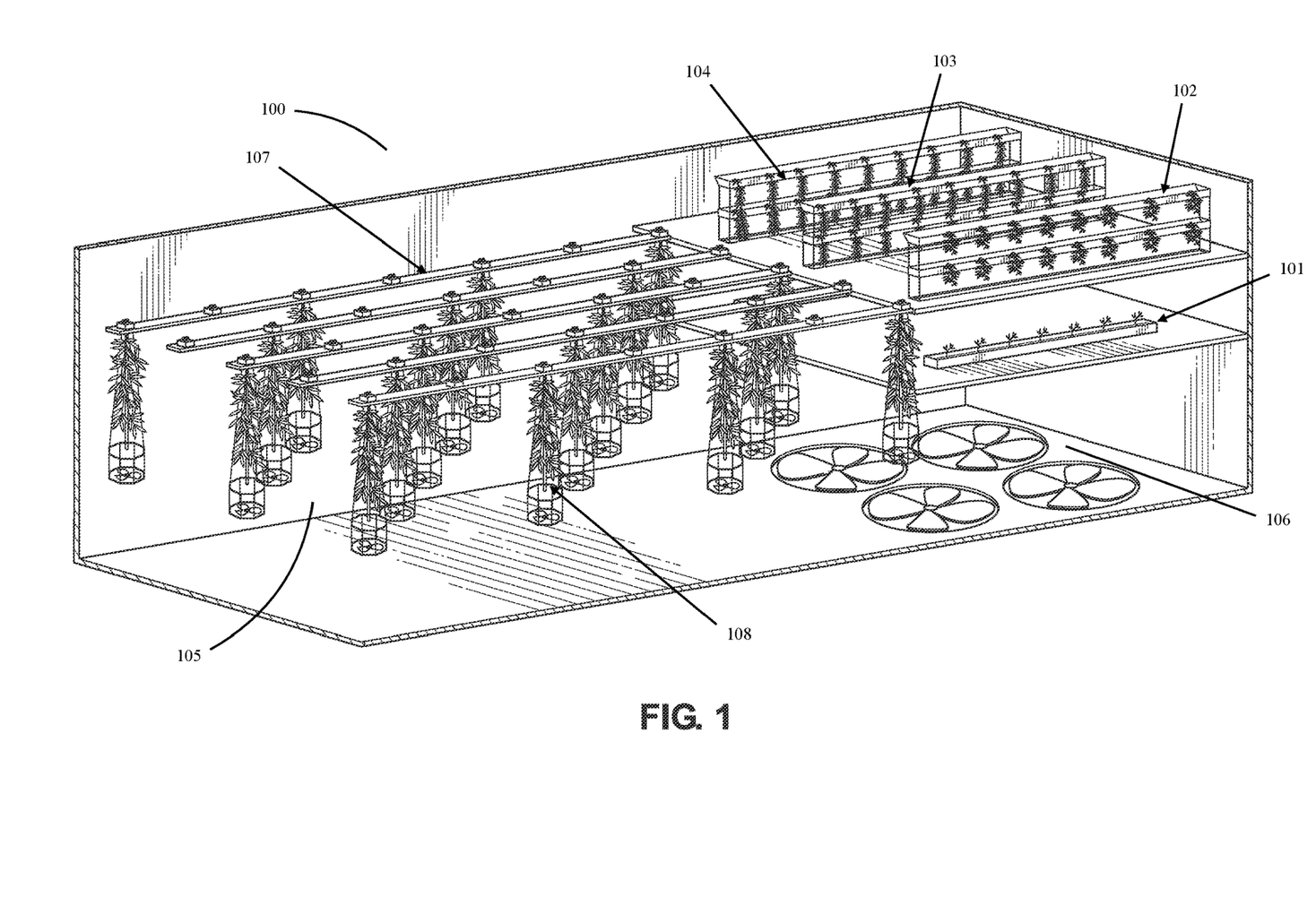
FIG. 1 shows a perspective view of an inverted plant growth and selection system and method of use in accordance with an embodiment of the present invention.

Turning attention to FIG. 1, a perspective view of an inverted hydroponics system in accordance with an embodiment of the invention is shown. In the embodiment depicted, a viewer may observe a warehouse structure 100 comprising a Sprouting Garden growing area 101, a Kender Garden growing area 102, a Middle Garden growing area 103, a High Garden growing area 104, a Main Grow area 105, and a Processing Area 106. The Main Grow area 105 further comprises a plurality of upper bracket beams 107 configured to suspend a plurality of inverted plants 108.

Figure 2:
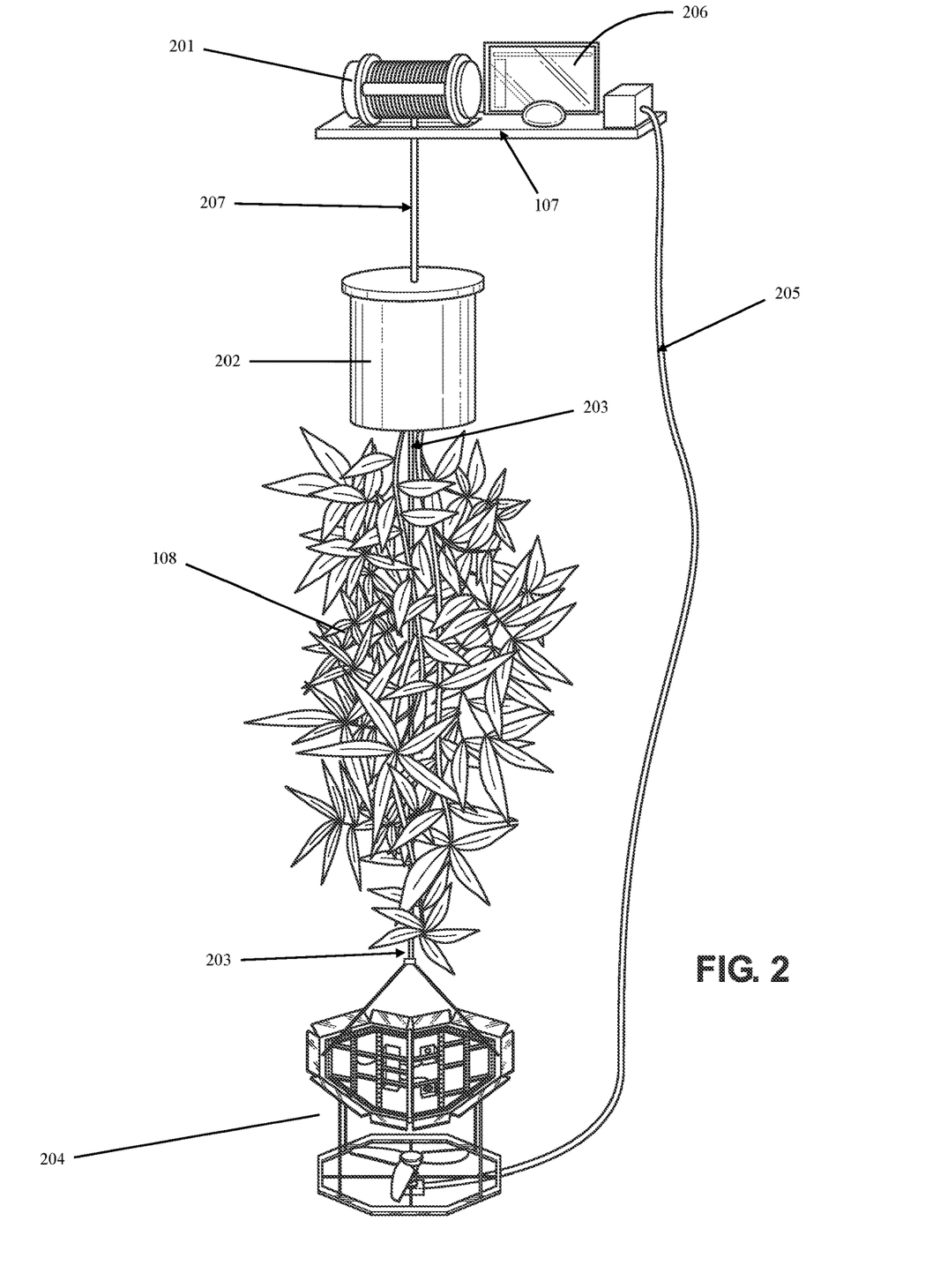
FIG. 2 shows a perspective view of an inverted plant growth and selection system and method of use in accordance with an embodiment of the present invention.

Turning to FIG. 2 a perspective view of an inverted plant growth and selection system and method of use in accordance with an embodiment of the present invention is shown. In the embodiment depicted, a viewer may perceive an inverted plant growth system 200 comprising a hoist module 201, a growth propagation vessel 202, an automated light module extension beam 203, an automated light and ambient air frequency stimulation module 204, and hoist module cable 205. The hoist 201 is affixed to an electrical distribution and control system 206. The hoist module cable 205 may be combined with an electrical cable (not shown) into one component, thereby eliminating the need for a separate hoist cable and electrical cable.

The hoist module 201 resides on top of an upper bracket beam 107 (shown as a cross-section) whereby the hoist module cable 207 extends from the hoist module 201 and through the growth propagation vessel 202. An inverted plant 108 grows vertically from the growth propagation vessel 202 (roots not shown) and along the length of the automated light module extension beam 203. The automated light and ambient air frequency stimulation module 204 is fixedly coupled to the base of the automated light module extension beam 203.

During the growth stages of the inverted plant 108 the hoist module 201 may be automated to raise and lower the automated light and ambient air frequency stimulation module 204. Specifically, sensors (not shown) may detect the growth stage of the inverted plant 108 and the automated computer system (not shown) signals the hoist module 201 to raise and lower the automated light and ambient air frequency stimulation module 204 thereby allowing the automated light and ambient air frequency stimulation module 204 to maintain the appropriate distance from the plant top 206 to allow for maximum plant growth.

Figure 3A:
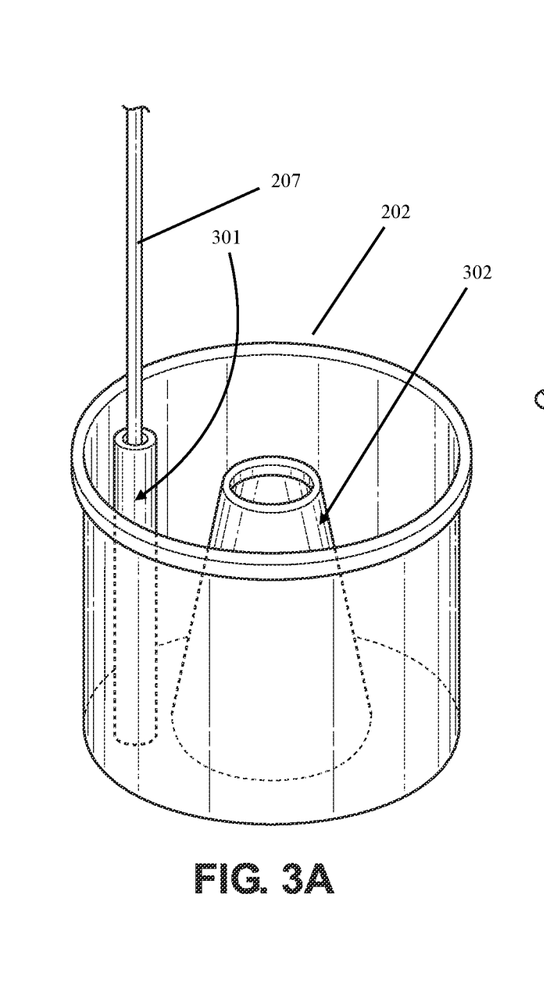
FIG. 3A shows a closed front view of a growth propagation vessel of an inverted plant growth and selection system and method of use in accordance with an embodiment of the present invention.
Figure 3B:
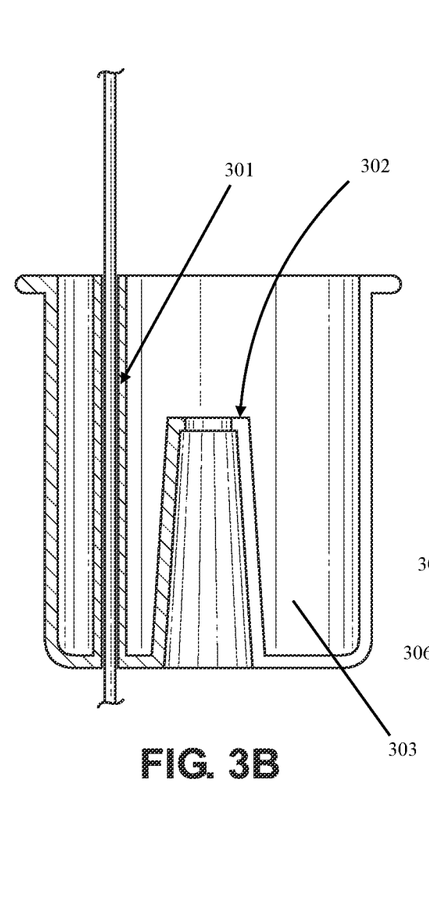
FIG. 3B shows a cross sectional front view of a growth propagation vessel of an inverted plant growth and selection system and method of use in accordance with an embodiment of the present invention.

In FIG. 3A, a viewer may perceive a growth propagation vessel 202 that is cylindrically shaped and configured to allow the hoist module cable 207 to pass through the cable tube 301 (FIG. 3B) located within the hollow interior 303 of the growth propagation vessel 202 and aligned on a parallel plane resting along the inner side walls of the growth propagation vessel 202. The hollow interior 303 of the growth propagation vessel 202 is further configured to hold a predetermined amount of aqueous solvent (not shown). A conical shaped cylinder 302 resides in the center interior of growth propagation vessel 202.

Figure 3C:
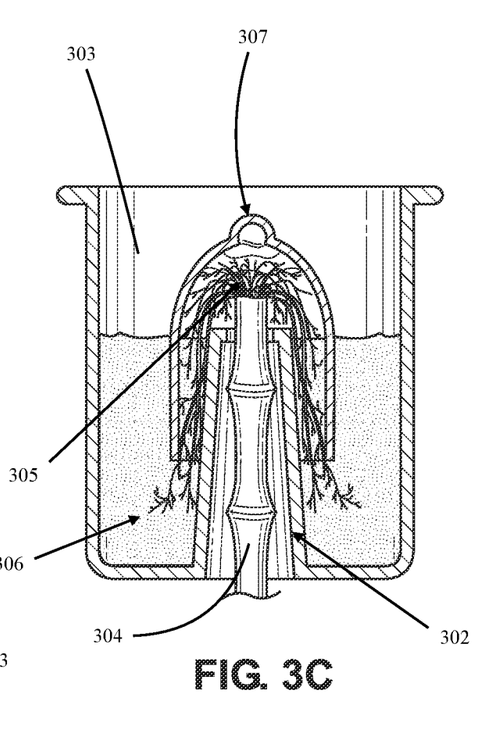
FIG. 3C shows a cross sectional front view of a growth propagation vessel of an inverted plant growth and selection system and method of use in accordance with an embodiment of the present invention.

When in use, and as shown in FIG. 3C, a plant stem 304 may be contained in the conical shaped cylinder 302 whereby the plant stem 304 extends through the conical shaped cylinder 302 and the plant roots 305 extend over the top edge of the conical shaped cylinder 302 and into an aqueous solvent 306 within the hollow interior 303 of the growth propagation vessel 202. The plant roots 305 may be supported and held in place by placing a root nourishment membrane 307 over the plant roots 305 thereby forcing the plant roots 305 to remain submerged in the aqueous solvent within the hollow interior 303 of the growth propagation vessel 202.

Figure 4A:
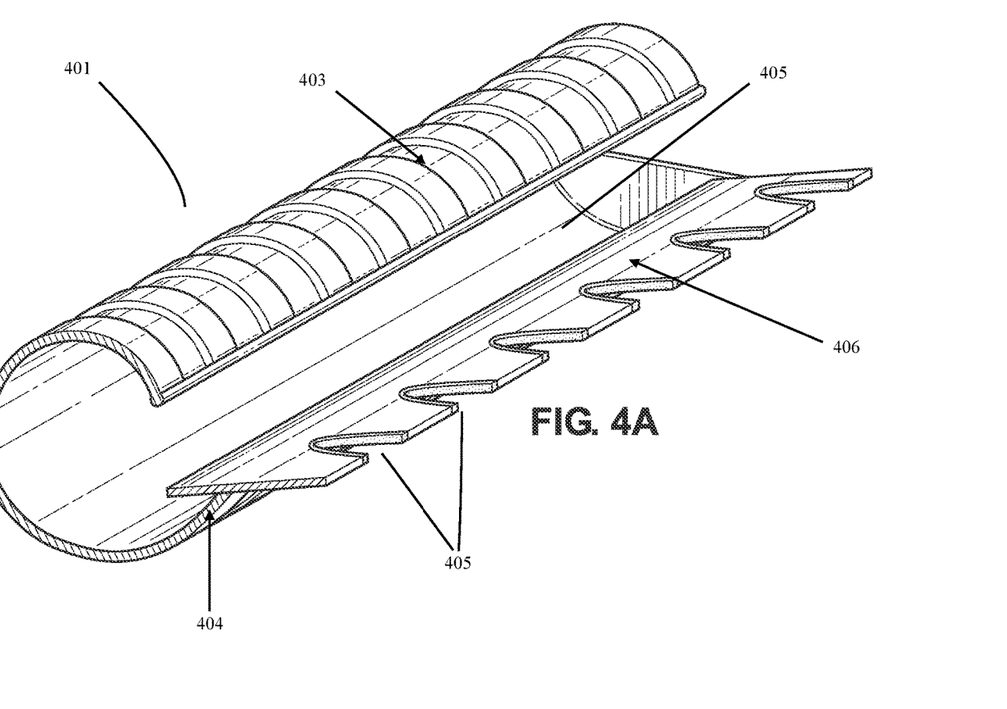
FIG. 4A shows a perspective view of a cylindrical cistern of an inverted plant growth and selection system and method of use in accordance with an embodiment of the present invention.

Turning to FIG. 4A a perspective view of a cylindrical cistern of an inverted plant growth and selection system and method of use in accordance with an embodiment of the present invention is shown. The cylindrical cistern 401 is cylindrically shaped and comprises a vertical platform 402 a hollow interior 405 a curved roof 403 and a protruding edge 404. In an alternative embodiment, the protruding edge 404 may be configured to hold a grooved platform (not shown) that is affixed to the protruding edge 404 of the cylindrical cistern 401. The cylindrical cistern 401 is further configured to hold a predetermined amount of aqueous solvent (not shown).

Figure 4B:
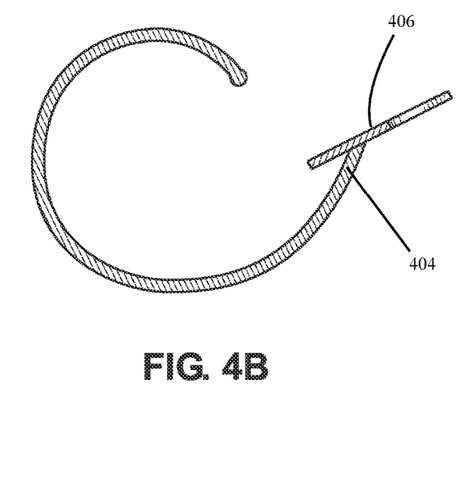
FIG. 4B shows a perspective view of a cylindrical cistern of an inverted plant growth and selection system and method of use in accordance with an alternative embodiment of the present invention.
Figure 4C:
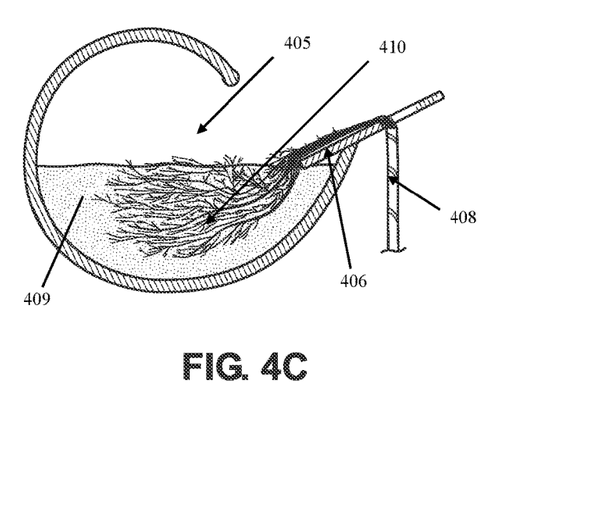
FIG. 4C shows a perspective view of a cylindrical cistern of an inverted plant growth and selection system and method of use in accordance with an alternative embodiment of the present invention.

As may be seen in FIG. 4B, a protruding grooved platform 406 may be affixed to the protruding edge 404 of the cylindrical cistern 401. As seen in FIG. 4C, the protruding grooved platform 406 is configured to extend beneath the surface of the predetermined unit of aqueous solvent contained within the hollow interior 405 of the cylindrical cistern. In some embodiments, the protruding grooved platform 406 is further configured to allow a plant root system 408 to lay over the top flat surface of the protruding grooved platform 406 whereby the plant roots 410 are submerged beneath the surface of the predetermined unit of aqueous solvent 409 contained within the hollow interior 405 cylindrical cistern 401 and the root stem 407 extends vertically and downwardly from the distal end of the mantel of the grooved support board 406. In alternative embodiments, the protruding grooved platform 406 is a hollow tube (not shown) and is configured to allow a plant root system 40 to be contained within the hollow interior of the hollow protruding grooved platform 406.

Figure 5A:
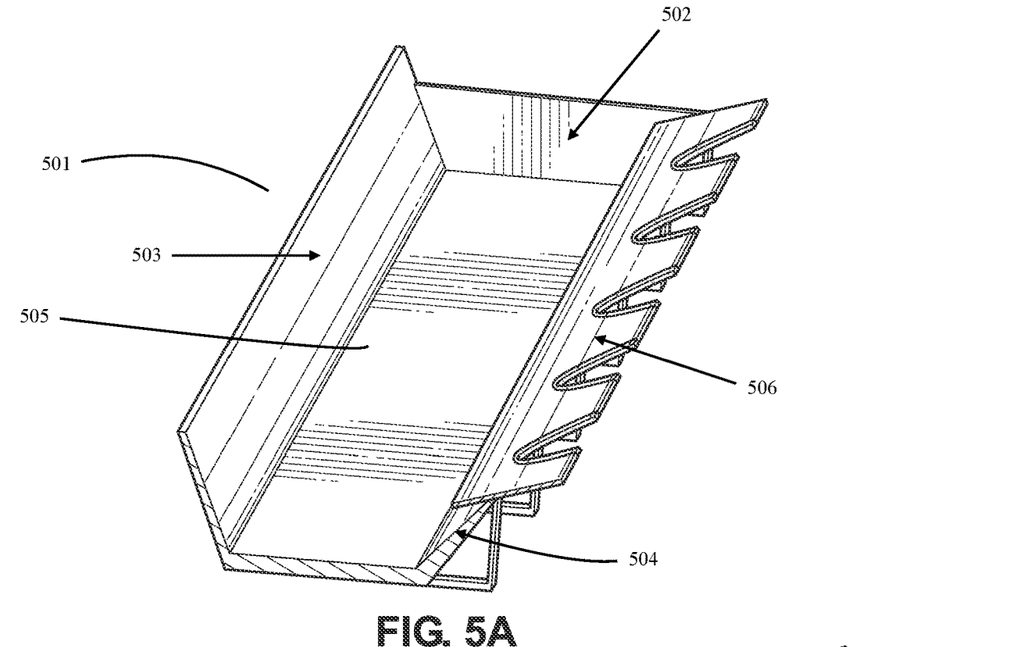
FIG. 5A shows a perspective cross-sectional exploded view of a trapezoidal cistern of the inverted plant growth and selection system and method of use in accordance with an alternative embodiment of the present invention.

In FIG. 5A a perspective view of a trapezoidal shaped cistern of an inverted plant growth and selection system and method of use in accordance with an embodiment of the present invention is shown. The trapezoidal shaped cistern 501 comprises a vertical side wall 502 a back wall 503 and a protruding front wall 504, and a hollow interior 505. The trapezoidal shaped cistern 501 is further configured to hold a predetermined amount of aqueous solvent (not shown). In an alternative embodiment, the protruding front wall 504 may be configured to hold a grooved platform (not shown) that is affixed to the protruding front wall 504 of the trapezoidal shaped cistern 501. One or more plants may be cradled along the protruding grooved platform (not shown).

Figure 5B:
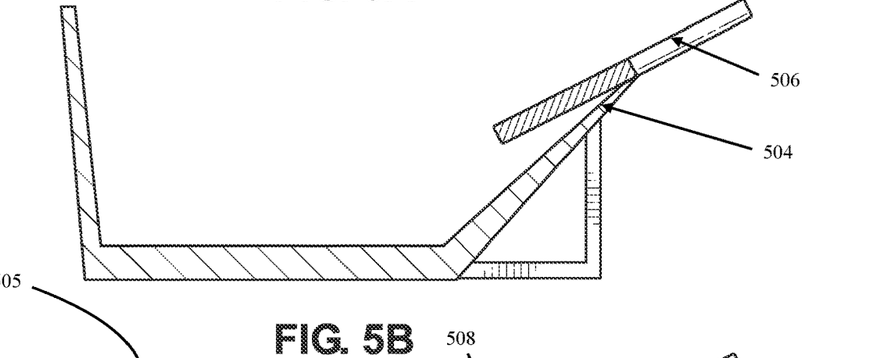
FIG. 5B shows a cross-sectional exploded view of a rectangular cistern of the inverted plant growth and selection system and method of use in accordance with an alternative embodiment of the present invention.
Figure 5C:
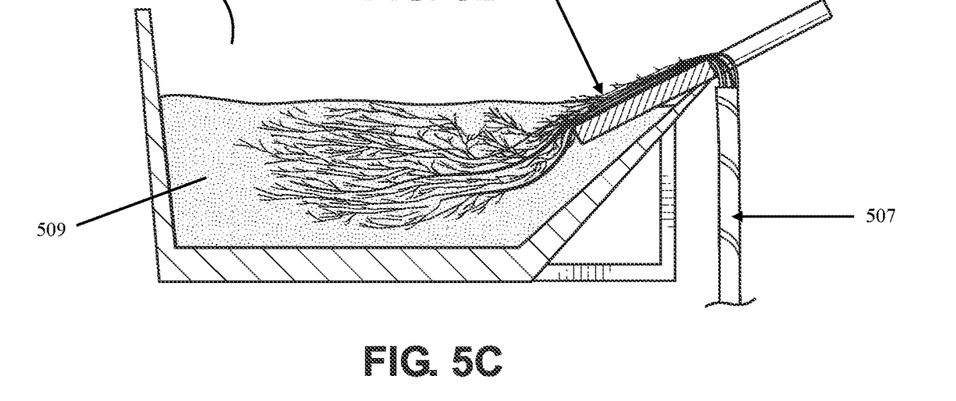
FIG. 5C shows a cross-sectional exploded view of a rectangular cistern of the inverted plant growth and selection system and method of use in accordance with an alternative embodiment of the present invention.

As may be seen in FIG. 5B, a protruding grooved platform 506 may be permanently affixed to the protruding front wall 504 of the trapezoidal shaped cistern 501. As seen in FIG. 5C, the protruding grooved platform 506 is configured to extend beneath the surface of the predetermined unit of aqueous solvent contained within the hollow interior 505 of the trapezoidal cistern. In some embodiments, the protruding grooved platform 506 is further configured to allow a plant root system 508 to lay over the top flat surface of the protruding grooved platform 506 whereby the plant roots 510 are submerged beneath the surface of the predetermined unit of aqueous solvent 509 contained within the hollow interior 505 trapezoidal cistern 501 and the root stem 507 extends vertically and downwardly from the distal end of the mantel of the grooved support board 506. In alternative embodiments, the protruding grooved platform 506 is a hollow tube (not shown) and is configured to allow a plant root system 508 to be contained within the hollow interior of the hollow protruding grooved platform 506.

Figure 6A:
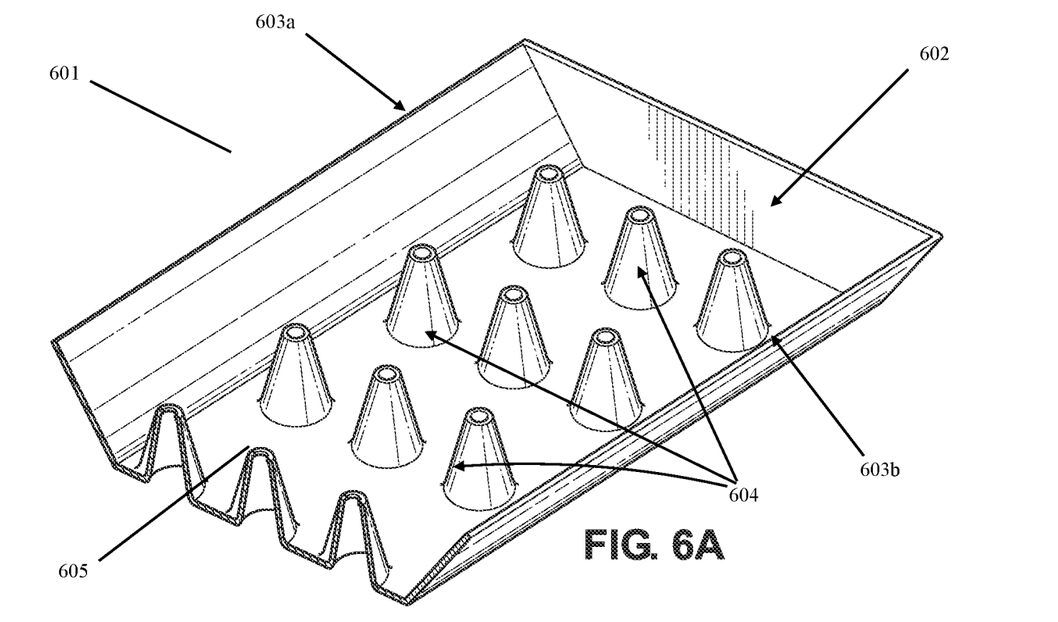
FIG. 6A shows a cross-sectional view of a growth propagation vessel cistern of the inverted plant growth and selection system and method of use in accordance with an alternative embodiment of the present invention.

Turning to FIG. 6 a perspective view of a growth propagation vessel cistern of an inverted plant growth and selection system and method of use in accordance with an embodiment of the present invention is shown. The growth propagation vessel cistern 601 is rectangularly shaped and comprises a vertical side wall 602 a hollow interior 605 comprising a plurality of conically shaped growth propagation vessels 604 and side walls 603a, 603b. The growth propagation vessel cistern 601 is further configured to hold a predetermined amount of aqueous solvent (not shown).

Figure 6B:
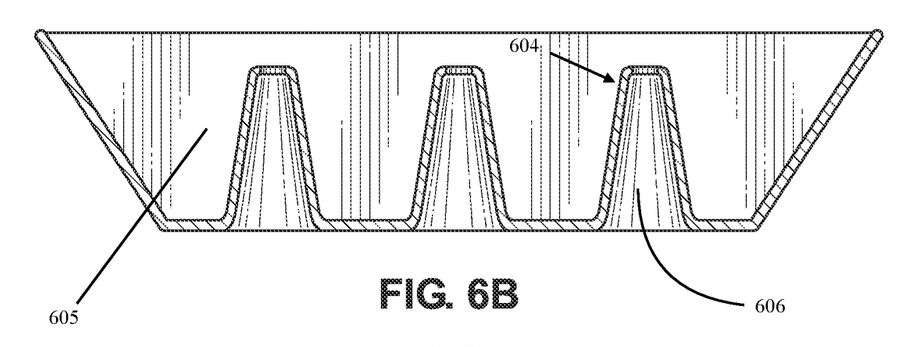
FIG. 6B shows a cross-sectional view of a growth propagation vessel cistern of the inverted plant growth and selection system and method of use in accordance with an alternative embodiment of the present invention.
Figure 6C:
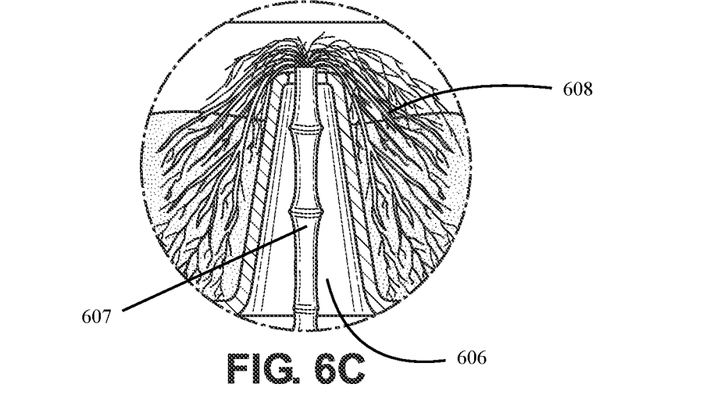
FIG. 6C shows a cross-sectional exploded view of the growth propagation vessel of a growth propagation vessel cistern of the inverted plant growth and selection system and method of use in accordance with an alternative embodiment of the present invention.

As may be seen in FIG. 6B and FIG. 6C, the plurality of conically shaped growth propagation vessels 604 are configured to contain a plurality of plant stems 607 whereby the plant stems 607 extend through the conically shaped growth propagation vessels 604 and the plant roots 608 extend over the top edge of the conically shaped growth propagation vessels 604 and into an aqueous solvent within the hollow interior 605 of the growth propagation vessel cistern 601.

Figure 7:
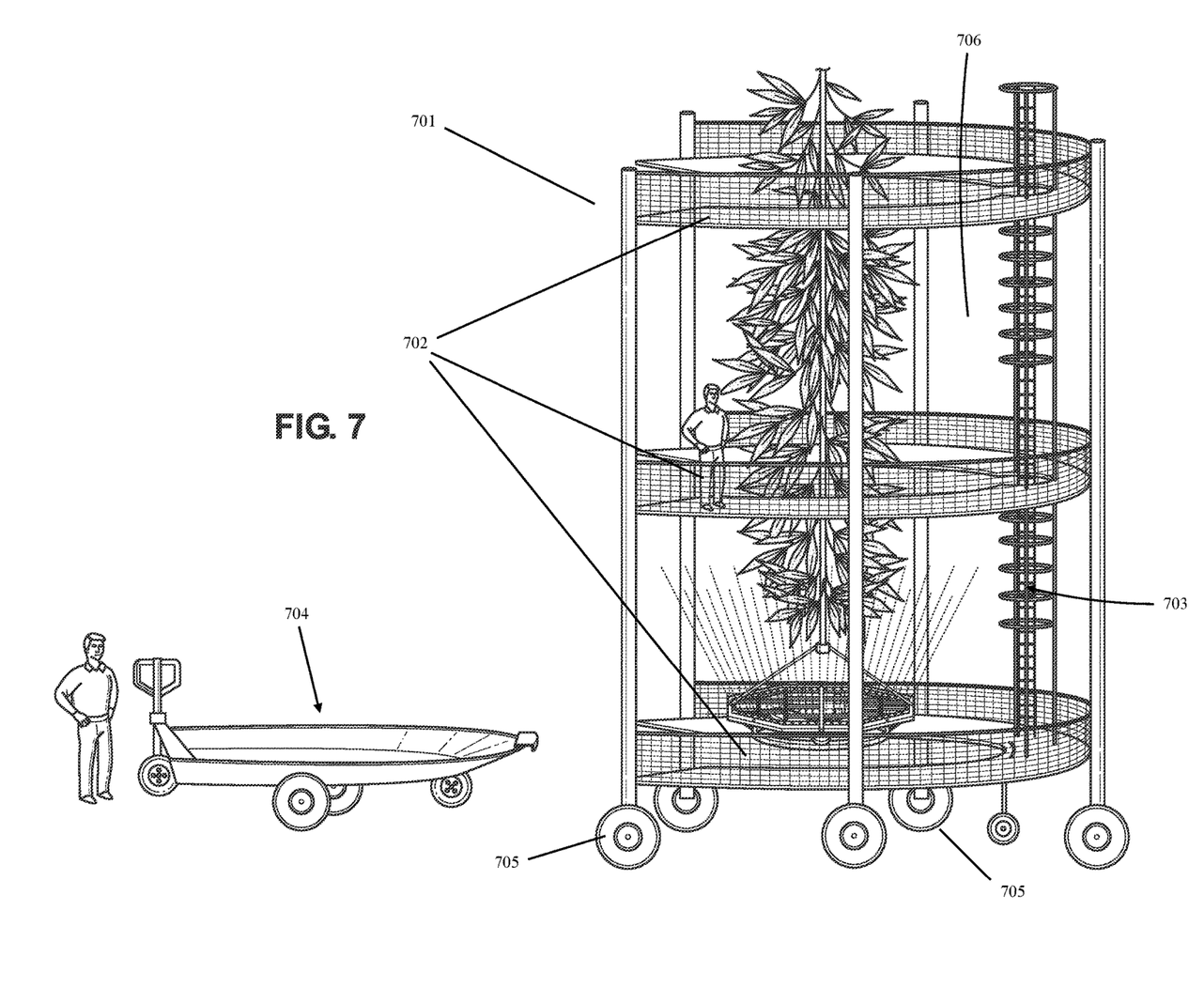
FIG. 7 shows a perspective view of a scaffold of the inverted plant growth and selection system and method of use in accordance with an embodiment of the present invention.
Figure 8:
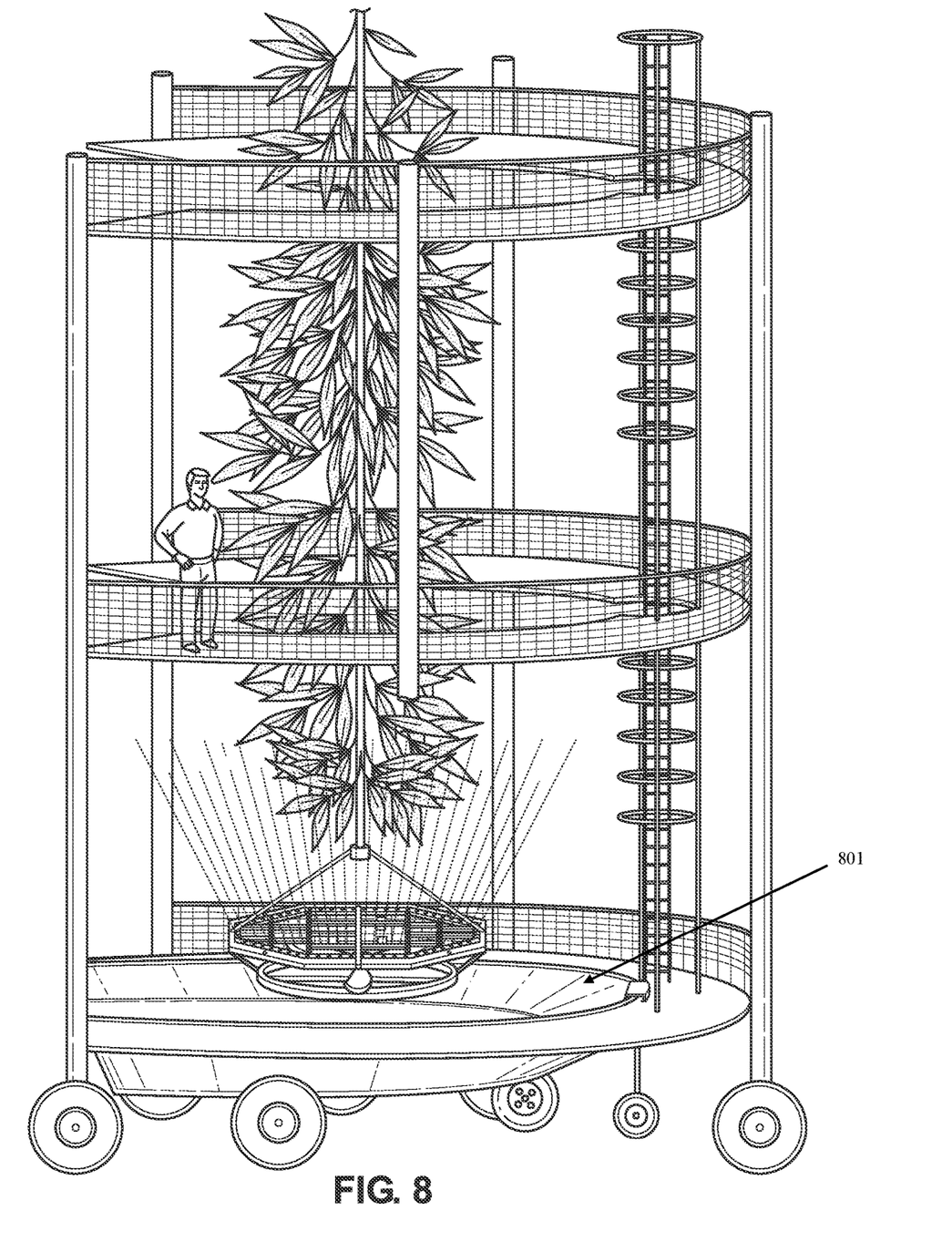
FIG. 8 shows a perspective view of a scaffold of the inverted plant growth and selection system and method of use in accordance with an embodiment of the present invention.

In FIG. 7A a perspective view of a scaffold of the inverted plant growth system and method of use in accordance with an embodiment of the present invention is shown. In the embodiment depicted, a viewer may perceive that the scaffold 701 is crescent shaped with a hollow interior 706 and comprises a plurality of levels 702, an internal ladder 703, and a plurality of wheels 705. The hollow interior 706 of the scaffold 701 is configured to be positioned around the body of an inverted plant system 104. The scaffold 701 is further configured to allow a multi-cart 704 to fit within the base 801 of the scaffold 701 as can be seen in FIG. 8.

Prior to the scaffolding process the system comprises of a culling, curating, and optimizing method (not shown). The culling, curating, and optimizing process occurs between the period in which the plant transitions from the High Garden growing area to the Main Grow area. In this phase, the system utilizes artificial intelligence to automatically selects a segment of plants for transitioning into the Main Grow area based on a predetermined state of maturity. The predetermined state of maturity may be based on several factors, for example the plant's size, species, height, genetic makeup, environmental elements, and or length. The non-selected plants are either continuously nurtured to reach the predetermined state of maturity or disposed or processed depending on the species and applicable regulations.

Figure 9A:
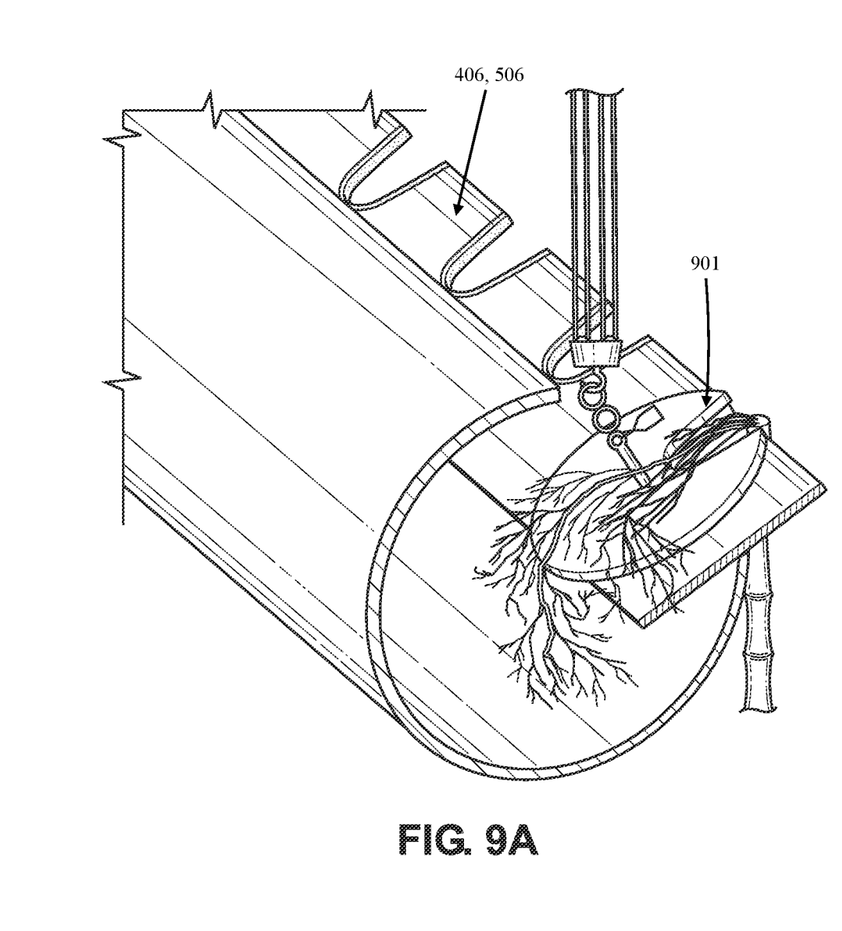
FIG. 9A shows an exploded view of a lifting hoist disk of the inverted plant growth and selection system and method of use in accordance with an embodiment of the present invention.
Figure 9B:
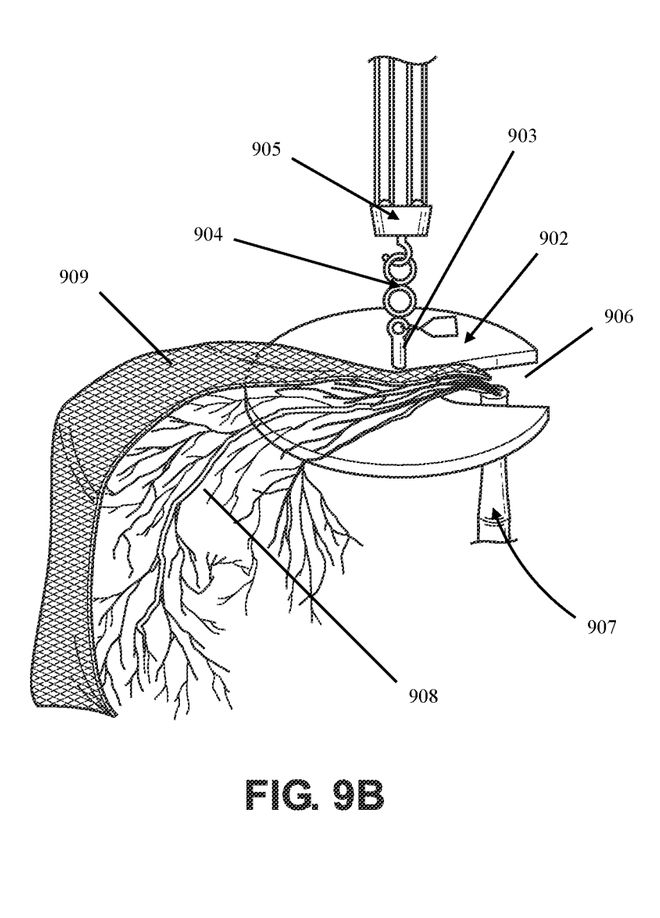
FIG. 9B shows an exploded view of a lifting hoist disk of the inverted plant growth and selection system and method of use in accordance with an embodiment of the present invention

Turning to FIG. 9A, a lifting hoist disk of the inverted plant growth and selection system and method of use in accordance with an embodiment of the present invention is shown. The lifting hoist disk 901 is configured to rest over a protruding grooved platform 406, 506 whereby the plant stem extends vertically and downwardly from the protruding grooved platform 406, 506. In FIG. 9B, a viewer may perceive that the lifting hoist disk 901 comprises a circular disk plate 902, a center stem 903 a multi loop stem 904 and a lift hoist hook 905. The lifting hoist disk 901 further comprises a crescent shaped cutout 906 that is configured to allow a plant root system 908 to lay over the circular disk plate 902 whereby the root stem 907 extends vertically from the base of the circular disk plate 902. In some embodiments, the plant root system 908 may be covered by a mesh material 909 to protect the plant root system 908 during the inverted plant growth cycle. While in use, the inverted plant (not shown) may be lifted from a cistern 401, 501, 601 by raising the lifting hoist disk 901 from the lift hoist hook 905 and raising the inverted plant (not shown) out of the cistern 401, 501, 601.

Figure 10:
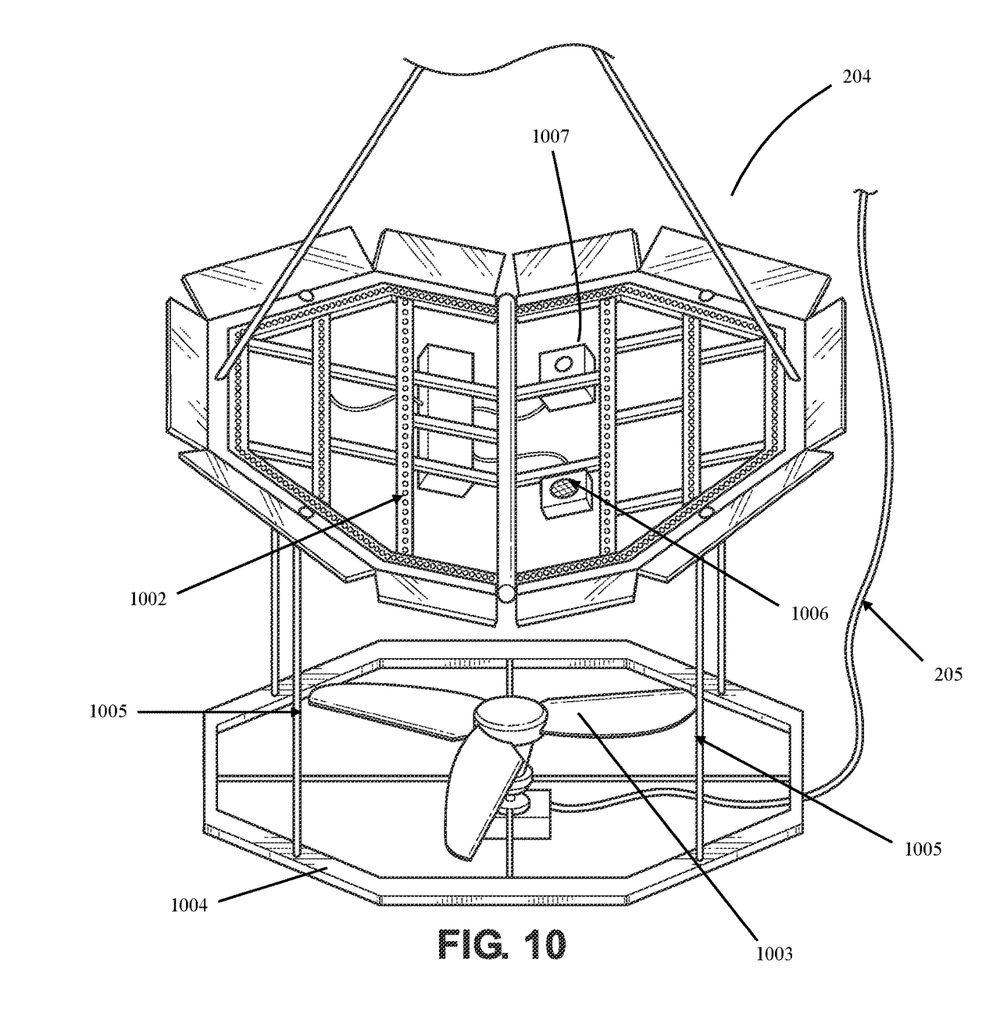
FIG. 10 shows an exploded view of a fanning light growth stimulation module of the inverted plant growth and selection system and method of use in accordance with an embodiment of the present invention.

In FIG. 10, an exploded view of an automated fanning light growth stimulation module 204 of the inverted plant growth and selection system and method of use in accordance with an embodiment of the present invention is shown. A viewer may perceive that the fanning light growth stimulation module 204 comprises a fan 1003, a plurality of lights 1002, at least one air sound frequency modulator 1006, a distance sensor 1007, a base frame 1004 and a hoist beam and cable system 1001 that fixedly connect the fanning light growth stimulation module 204 to the automated light module extension beam 203 (not shown). The automated fanning light growth stimulation module 204 is fixedly coupled to the electrical distribution and control system (not shown) via the electrical cable 205. A viewer may also perceive that the fan 1003 is fixedly connected to base frame 1004 by a plurality of support beams 1005. The air sound frequency modulator 1006 may comprise of a plurality of transmitters and receivers. Whereby the frequencies transmitted will encourage the plants to grow and develop more rapidly. The distance sensor 1007 will automatically adjust the distance from the automated fanning light growth stimulation module 204 and the plant to maximize the stage of the plant's development.

Figure 11:
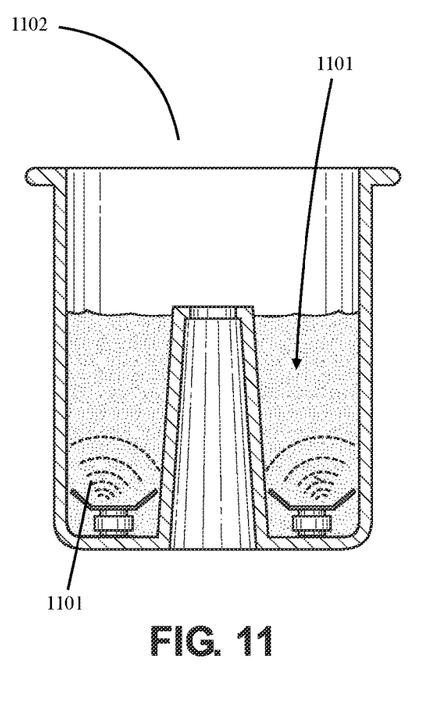
FIG. 11 shows a cross sectional view of the growth propagation vessel of the inverted plant growth and selection system and method of use in accordance with an alternative embodiment of the present invention.

In FIG. 11, a cross sectional view of the growth propagation vessel of the inverted plant growth and selection system and method of use in accordance with an alternative embodiment of the present invention is shown. A viewer may perceive that the 1102 growth propagation vessel comprises of at least two 1101 frequency emission systems that provide predetermined frequency through the aqueous solvent residing in the 1102 growth propagation vessel.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the present invention generally described herein has been disclosed in connection with a number of embodiments shown and described in detail, various modifications should be readily apparent to those of skill in the art.

What is claimed is:

1. A method for inverted hydroponic plant growth comprising the steps of:
    configuring a building or warehouse structure to comprise a growing area, a harvesting area, and a processing area wherein the growing area has a first designated growth area, a second designated growth area, a third designated growth area, a fourth designated growth area, and a fifth designated growth area, the harvesting area has at least one harvesting scaffold and at least one hoist lifting system, and the growing area has at least one upper bracket beam system, at least one electronically controlled fan, and at least one electronically controlled frequency emission system;
    sprouting a plant from a seed in the first designated growth area;
    removably coupling at least one plant into at least one grooved root containment support beam of at least one cistern having an aquatic solution in an inverted position in the second designated growth area;
    transitioning and removably coupling the at least one plant into at least one grooved root containment support beam of at least one cistern having an aquatic solution in an inverted position in the third designated growth area;
    transitioning and removably coupling the at least one plant into at least one grooved root containment support beam of at least one growing propagation vessel having an aquatic solution in an inverted position in the fourth designated growth area;

transitioning and removably coupling the at least one plant into at least one grooved root containment support beam of at least one growing propagation vessel having an aquatic solution in an inverted position in the fifth designated growth area;

providing air, light, and frequency stimulation to at least one plant in the growing areas;

processing at least one plant in the processing area; and harvesting at least one plant, wherein the height, weight, aquatic solution consumption and growth rate of at least one inverted plant is determined and the inverted plant is transitioned to the processing area when the inverted plant reaches a predetermined state of plant maturity.

2. The method for inverted hydroponic plant growth of claim 1, wherein the height, weight, aquatic solution consumption, and growth rate of at least one inverted plant is monitored and the inverted plant is transitioned from the second designated growth area to the third designated growth area when the inverted plant reaches a growth size of thirty-six to sixty inches.

3. The method for inverted hydroponic plant growth of claim 1, wherein the height, weight, aquatic solution consumption and growth rate of at least one inverted plant is monitored and the inverted plant is transitioned from the third designated growth area to the fourth designated growth area when the inverted plant reaches a growth size of seventy-two to ninety-six inches.

4. The method for inverted hydroponic plant growth of claim 1, wherein at least one inverted plant residing in at least one growing propagation vessel in the fifth growth area is removably coupled to at least one automatic lifting module.

5. The method for inverted hydroponic plant growth of claim 4, wherein the automatic lifting module is fixedly coupled to a proximal end of the growing propagation vessel and the growth stimulation module is removably coupled to a distal end of the growing propagation vessel.

6. The method for inverted hydroponic plant growth of claim 1, wherein at least one electronically controlled fanning system provides predetermined air circulation to the at least one inverted plant system.

7. The method for inverted hydroponic plant growth of claim 1, wherein at least one electronically controlled lighting system provides predetermined light to the at least one inverted plant system.

8. The method for inverted hydroponic plant growth of claim 1, wherein at least one electronically controlled frequency emission system provided predetermined frequency modulations to the at least one inverted plant system.

9. The method for inverted hydroponic plant growth of claim 1, wherein the height, weight, aquatic solution consumption and growth rate of at least one inverted plant is determined and the inverted plant is transitioned to the fifth grow area when the inverted plant reaches a predetermined state of plant maturity.

10. The method for inverted hydroponic plant growth of claim 9, wherein a first subset of a set of plants are transitioned into the fifth growth area and a second subset of a set of plants remain in the fourth growth area based on the predetermined state of plant maturity.

11. The method for inverted hydroponic plant growth of claim 9, wherein a first subset of a set of plants are transitioned into the fifth growth area and a second subset of a set of plants are discarded based on the predetermined state of plant maturity.

12. The method for inverted hydroponic plant growth of claim 1, wherein a plurality of electronically controlled fans and a plurality of electronically controlled frequency emission systems are placed within the processing area whereby the plurality of electronically controlled fans and plurality of electronically controlled frequency emission systems provide a predetermined level of air circulation and frequency modulation to the inverted plant systems.

\* \* \* \* \*